US012640295B2

(12) United States Patent
Ebara

(10) Patent No.: US 12,640,295 B2
(45) Date of Patent: May 26, 2026

(54) SUPERCONDUCTING MAGNET DEVICE

(71) Applicant: SUMITOMO HEAVY INDUSTRIES, LTD., Tokyo (JP)

(72) Inventor: Yuta Ebara, Yokosuka (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 268 days.

(21) Appl. No.: 18/604,527

(22) Filed: Mar. 14, 2024

(65) Prior Publication Data

US 2024/0321493 A1 Sep. 26, 2024

(30) Foreign Application Priority Data

Mar. 22, 2023 (JP) ................................ 2023-045886

(51) Int. Cl.
*H01F 6/02* (2006.01)
*H01F 6/00* (2006.01)

(52) U.S. Cl.
CPC ............... *H01F 6/02* (2013.01); *H01F 6/008* (2013.01)

(58) Field of Classification Search
CPC ... H01F 6/008; H01F 6/02; H01F 6/04; H01F 6/06; H01F 13/003; Y02E 40/60
See application file for complete search history.

(56) References Cited

U.S. PATENT DOCUMENTS

2022/0230792 A1 7/2022 Hashimoto et al.

FOREIGN PATENT DOCUMENTS

| | | | |
|---|---|---|---|
| JP | 2015-142044 A | 8/2015 | |
| JP | 2022-110323 A | 7/2022 | |
| WO | WO-2006115126 A1 * | 11/2006 | ............... H01F 6/02 |

* cited by examiner

*Primary Examiner* — Mohamad A Musleh
(74) *Attorney, Agent, or Firm* — HEA Law PLLC

(57) ABSTRACT

A superconducting magnet device includes a plurality of superconducting coil excitation circuits which each include a superconducting coil and an exciting power supply thereof and are operable independently of each other, a plurality of quenching detectors each of which detects quenching of the superconducting coil of a corresponding superconducting coil excitation circuit, and a controller that, when at least one of the plurality of quenching detectors detects the quenching, controls the exciting power supply of a superconducting coil excitation circuit in which the quenching is not detected among the plurality of superconducting coil excitation circuits to demagnetize the superconducting coil of that superconducting coil excitation circuit.

2 Claims, 3 Drawing Sheets

10

SUPERCONDUCTING MAGNET DEVICE

CROSS-REFERENCE TO RELATED APPLICATIONS

This application claims priority to Japanese Patent Application No. 2023-045886, filed on Mar. 22, 2023, which is incorporated by reference herein in its entirety.

BACKGROUND

Technical Field

A certain embodiment of the present invention relates to a superconducting magnet device.

Description of Related Art

An undesired phenomenon that may occur during the operation of the superconducting magnet device is thermal runaway (quenching) of the superconducting coil. When quenching occurs, the superconducting coil transitions from the superconducting state to the normal conducting state, and resistance is generated inside the coil. A large Joule heat can be generated from a large current flowing through the coil in the superconducting state up to that point. An increase in voltage within the coil and the resulting discharge may also occur. In addition, a large electromagnetic force can act on the superconducting coil due to the transient current unbalance when quenching occurs. An eddy current is also generated in a conductor disposed in the vicinity of the coil, and an electromagnetic force can act on the conductor. The heat, discharge, and electromagnetic force that can be generated in this manner can damage the superconducting coil and surrounding structures and devices. Therefore, it has been proposed to provide an induction coil near the superconducting coil. When quenching occurs, energy can be recovered from the superconducting coil to the induction coil by electromagnetic induction, and the energy of the superconducting coil can be released.

SUMMARY

According to an embodiment of the present invention, there is provided a superconducting magnet device including a plurality of superconducting coil excitation circuits which each include a superconducting coil and an exciting power supply thereof and are operable independently of each other, a plurality of quenching detectors each of which detects quenching of the superconducting coil of a corresponding superconducting coil excitation circuit, and a controller that, when at least one of the plurality of quenching detectors detects the quenching, controls the exciting power supply of a superconducting coil excitation circuit in which the quenching is not detected among the plurality of superconducting coil excitation circuits to demagnetize the superconducting coil of that superconducting coil excitation circuit.

DETAILED DESCRIPTION

Figure 1:
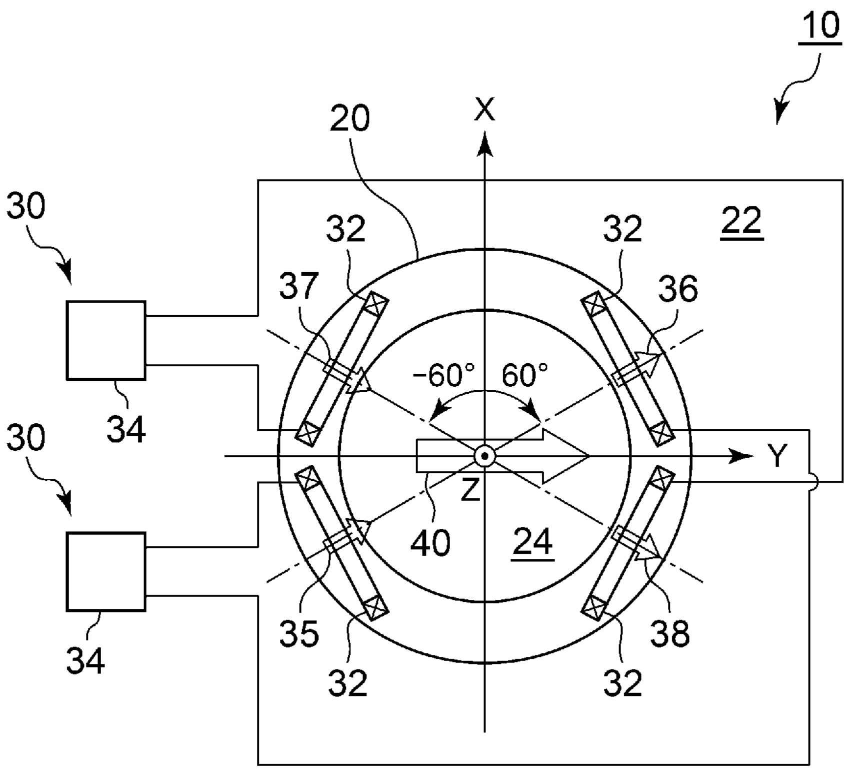
FIG. 1 is a sectional view schematically showing a main part of a superconducting magnet device according to an embodiment.

When quenching occurs, the temperature of the superconducting coil rises. In order to recover the superconducting coil from the quenching and to operate the superconducting coil again, it is necessary to recool the superconducting coil.

It is desirable to shorten the time required to recover the superconducting magnet device from quenching.

Hereinafter, embodiments for carrying out the present invention will be described in detail with reference to the drawings. In the description and drawings, identical or equivalent components, members, and processing are denoted by the same reference numerals, and overlapping description is omitted as appropriate. The scale or shape of each part that is shown in the drawings is conveniently set for ease of description and is not limitedly interpreted unless otherwise specified. The embodiments are exemplary and do not limit the scope of the present invention in any way. All features or combinations thereof described in the embodiments are not necessarily essential to the invention.

Figure 2:
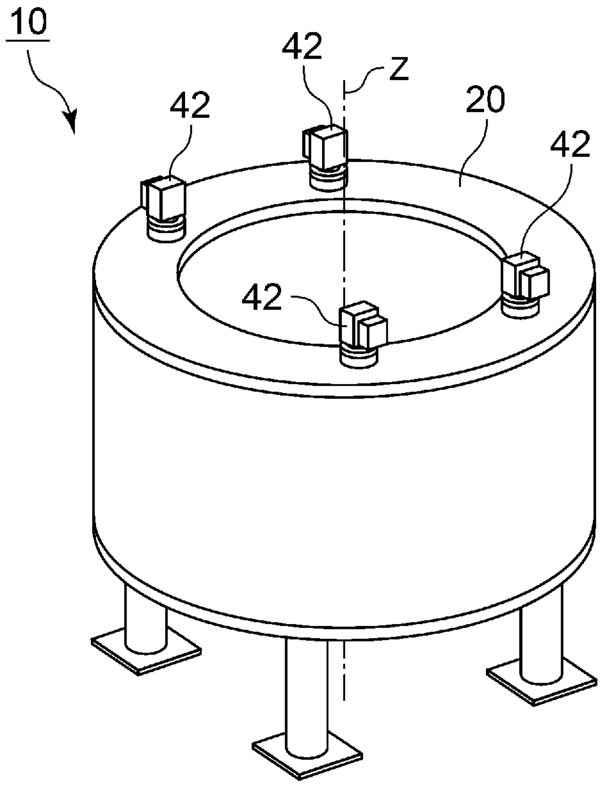
FIG. 2 is a perspective view schematically showing an appearance of the superconducting magnet device according to the embodiment.
Figure 3:
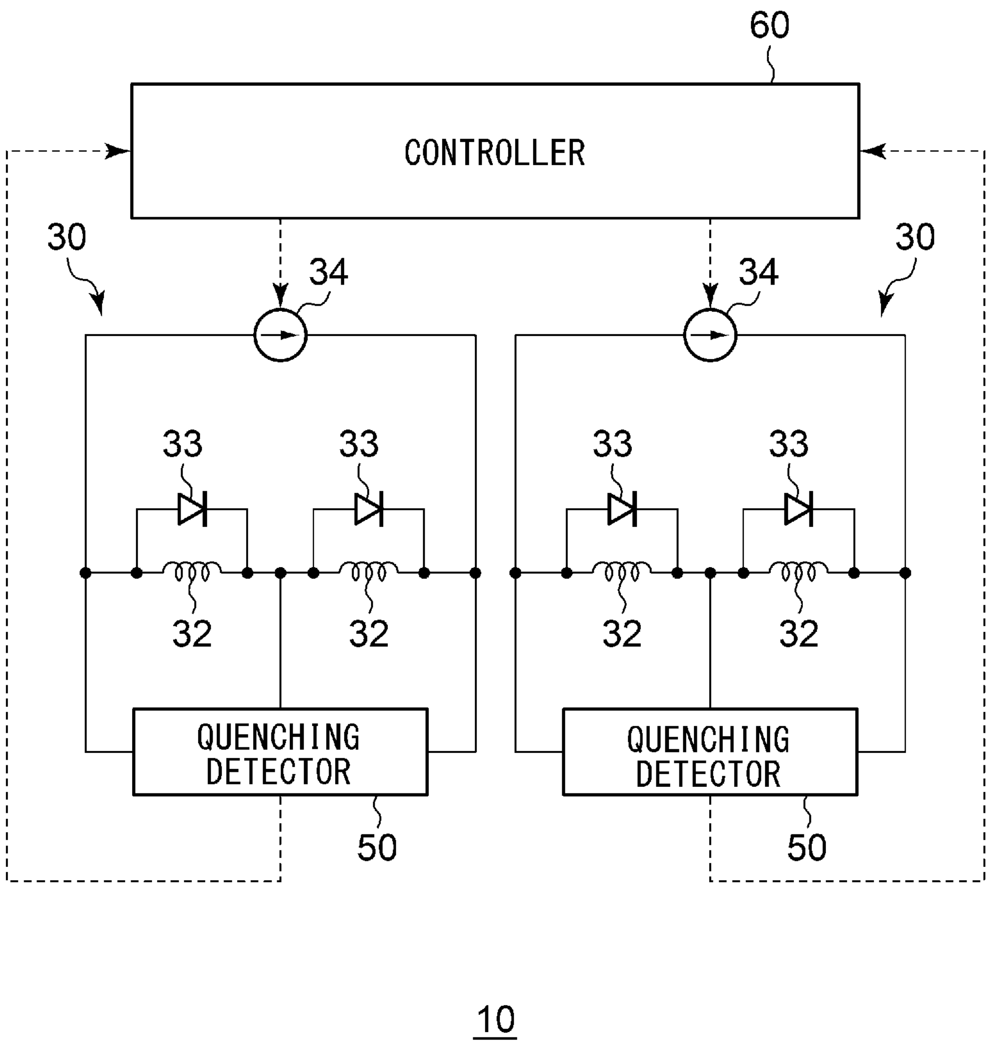
FIG. 3 is a diagram schematically showing an example of a power supply configuration of the superconducting magnet device according to the embodiment.

FIG. 1 is a sectional view schematically showing a main part of a superconducting magnet device 10 according to an embodiment. FIG. 2 is a perspective view schematically showing an appearance of the superconducting magnet device 10 according to the embodiment. FIG. 3 is a diagram schematically showing an example of a power supply configuration of the superconducting magnet device 10 according to the embodiment.

The superconducting magnet device 10 can be used as a magnetic field generation source of a single crystal pulling device. The single crystal pulling device is, for example, a silicon single crystal pulling device. As illustrated, the superconducting magnet device 10 includes a tubular cryostat 20 and a plurality of superconducting coil excitation circuits 30. Each of the plurality of superconducting coil excitation circuits 30 includes a pair of superconducting coils 32 disposed to face each other and an exciting power supply 34 thereof, and can operate independently of each other. The plurality of superconducting coil excitation circuits 30 are separated from each other and are not electrically connected to each other.

The exciting power supply 34 of each superconducting coil excitation circuit 30 may be an individual power supply device that can operate independently. In this case, the superconducting magnet device 10 may include a plurality of power supply devices, each of which has an exciting power supply 34. Alternatively, a plurality of exciting power supplies 34 may be mounted in a single power supply device. In this case, the power supply device may have a plurality of power supply outputs that can operate independently, or each power supply output may operate as one exciting power supply 34.

In the following, for convenience of explanation, a Cartesian coordinate system will be considered in which the center axis of the superconducting magnet device 10 is the Z axis and the two axes orthogonal to the Z axis are the X axis and the Y axis, respectively. The single crystal pulling axis corresponds to the Z axis, and the X axis and the Y axis can be defined on the melt surface perpendicular to the single crystal pulling axis. FIG. 1 schematically shows a cross-section of the superconducting magnet device 10 on an XY plane, and the Z axis extends in a direction perpendicular to the paper plane.

The tubular cryostat 20 has an internal space isolated from the surrounding environment 22 surrounding the tubular cryostat 20, and the superconducting coil 32 is disposed in this internal space. The internal space has, for example, a donut shape or cylindrical shape. The tubular cryostat 20 is an adiabatic vacuum chamber, and during the operation of the superconducting magnet device 10, a cryogenic vacuum environment suitable for bringing the superconducting coils 32 into a superconducting state is provided in the internal space of the tubular cryostat 20. The tubular cryostat 20 is formed of a metal material such as stainless steel or other suitable high-strength material to withstand ambient pressure (for example, atmospheric pressure).

The tubular cryostat 20 defines a central cavity 24 inside. The superconducting coils 32 are disposed so as to surround the central cavity 24 on the outside of the central cavity 24. When the superconducting magnet device 10 is mounted on the single crystal pulling device, a crucible for accommodating the melt of a single crystal material is disposed in the central cavity 24. The central cavity 24 is a part of the surrounding environment 22 surrounding the tubular cryostat 20 (that is, outside the tubular cryostat 20), and is, for example, a columnar space surrounded by the tubular cryostat 20.

In this embodiment, the superconducting magnet device 10 includes two superconducting coil excitation circuits 30. Since each superconducting coil excitation circuit 30 has two superconducting coils 32, a total of four superconducting coils 32 are provided in the superconducting magnet device 10. The superconducting coils 32 have the same shape and the same size, and in this example, are circular coils having the same diameter.

The first pair of the superconducting coils 32 provided in the one superconducting coil excitation circuit 30 is disposed to face each other with the central cavity 24 interposed therebetween, and is disposed such that the coil center axis coincides with a line forming 60 degrees from the X axis clockwise around the Z axis, as illustrated. The second pair of the superconducting coils 32 provided in the other superconducting coil excitation circuit 30 is disposed to face each other with the central cavity 24 interposed therebetween, and is disposed such that the coil center axis coincides with a line forming −60 degrees from the X axis clockwise around the Z axis, as illustrated. In this way, the four superconducting coils 32 are disposed symmetrically around the Z axis such that each of the four superconducting coils 32 generates a magnetic field in the radial direction (direction perpendicular to the Z axis).

The exciting power supply 34 of the superconducting coil excitation circuit 30 is disposed outside the tubular cryostat 20. The first exciting power supply 34 provided in one superconducting coil excitation circuit 30 and the second exciting power supply 34 provided in the other superconducting coil excitation circuit 30 can operate independently of each other. A first exciting power supply 34 is connected in series with the first pair of superconducting coils 32, and supplies a first exciting current to the superconducting coils 32. A second exciting power supply 34 is connected in series with the second pair of superconducting coils 32, and supplies a second exciting current to the superconducting coils 32. Therefore, in the superconducting magnet device 10, the first exciting current and the second exciting current can be made equal to each other, or the first exciting current and the second exciting current can be made different from each other.

The first exciting power supply 34 and the second exciting power supply 34 may be two independent power supplies independent of each other. Alternatively, the first exciting power supply 34 and the second exciting power supply 34 may be mounted on a single power supply device, and may be two power supply outputs that can operate independently of each other, among a plurality of power supply outputs that the power supply device has.

The first exciting power supply 34 supplies the first exciting current to the first pair of superconducting coils 32, thereby, as schematically shown by arrows 35 and 36 in FIG. 1, causing one of the first pair of superconducting coils 32 (for example, the superconducting coil 32 on the lower left side with respect to the origin in FIG. 1) to generate a magnetic field radially inward (direction perpendicular to the Z axis and toward the Z axis), and the other superconducting coil 32 (for example, the superconducting coil 32 on the upper right side with respect to the origin in FIG. 1) to generate a magnetic field radially outward (direction perpendicular to the Z axis and away from the Z axis). Further, the second exciting power supply 34 supplies the second exciting current to the second pair of superconducting coils 32, thereby, as schematically shown by arrows 37 and 38 in FIG. 1, causing one of the second pair of superconducting coils 32 (for example, the superconducting coil 32 on the upper left side with respect to the origin in FIG. 1) to generate a magnetic field radially inward (direction perpendicular to the Z axis and toward the Z axis), and the other superconducting coil 32 (for example, the superconducting coil 32 on the lower right side with respect to the origin in FIG. 1) to generate a magnetic field radially outward (direction perpendicular to the Z axis and away from the Z axis).

In this way, the plurality of superconducting coil excitation circuits 30 of the superconducting magnet device 10 can generate the combined magnetic field 40 in the central portion of the central cavity 24. In the illustrated example, the combined magnetic field 40 is a magnetic field directed in the +Y direction.

As shown in FIG. 2, the superconducting magnet device 10 includes at least one cryocooler 42, and the superconducting coils 32 disposed in the tubular cryostat 20 are thermally coupled to the cryocooler 42. The cryocooler 42 may be, for example, a two-stage Gifford-McMahon (GM) cryocooler or another type of cryocooler. Each superconducting coil is used in a state of being cooled to a cryogenic temperature equal to or lower than the superconducting transition temperature by the cryocooler 42. In this embodiment, the superconducting magnet device 10 is configured as a so-called conduction cooling type in which the superconducting coil is directly cooled by the cryocooler 42 instead of being immersed in a cryogenic liquid refrigerant such as liquid helium.

In the illustrated example, four cryocoolers 42 are installed on the upper surface of the tubular cryostat 20. Therefore, one cryocooler 42 is provided for one superconducting coil 32. The superconducting magnet device 10 may include a smaller number of cryocoolers 42. For example, two cryocoolers 42 may be installed in the tubular cryostat 20 and may be disposed around the Z axis at intervals of 180 degrees. In this case, the cryocooler 42 may be disposed between the two adjacent superconducting coils 32, and may cool the two superconducting coils 32. By installing the cryocooler 42 using an empty space between the coils, the tubular cryostat 20 can be more compactly designed, and the superconducting magnet device 10 can be downsized. Alternatively, the superconducting magnet device 10 may include a larger number of cryocoolers 42. For example, when the superconducting coil 32 is large in size, one superconducting coil 32 may be cooled by a plurality of cryocoolers 42.

As shown in FIG. 3, the superconducting magnet device 10 includes a plurality of quenching detectors 50 and a controller 60 together with a plurality of superconducting coil excitation circuits 30.

Each of the plurality of quenching detectors 50 is configured to detect the quenching of the superconducting coil 32 of the corresponding superconducting coil excitation circuit 30. The quenching detector 50 is provided for each superconducting coil excitation circuit 30.

The quenching detector 50 is configured to detect quenching in at least one superconducting coil 32 of the superconducting coil excitation circuit 30 based on various known quenching detection methods and output a quenching detection signal. As an example, the quenching detector 50 may detect the quenching by measuring a voltage generated in the superconducting coil 32 when the quenching is generated. For example, the quenching detector 50 may measure a balanced voltage of a bridge circuit including the superconducting coils 32 and a resistor, and output a quenching detection signal based on the measured balanced voltage. The quenching detection method is not particularly limited, and the quenching detector 50 may detect any change that may be caused by the quenching, for example, an electrical change, a magnetic change, a thermal change, or an acoustic change from the superconducting state (that is, a state in which no quenching has occurred) of the superconducting coil 32, such as an electrical change, a magnetic change, and a thermal change of the superconducting coil 32, and output the quenching detection signal.

The controller 60 is configured to control the plurality of superconducting coil excitation circuits 30 based on the detection results of the plurality of quenching detectors 50. For example, the controller 60 is configured to receive a quenching detection signal from each of the plurality of quenching detectors 50 and to control the plurality of superconducting coil excitation circuits 30 based on the received quenching detection signal.

The controller 60 may be built in any exciting power supply 34 of a plurality of exciting power supplies 34. In a case where the plurality of exciting power supplies 34 are mounted on a single power supply device, the controller 60 may be built in the power supply device. Alternatively, the controller 60 may be provided as a control device separate from the exciting power supply 34.

When at least one of the plurality of quenching detectors 50 detects quenching (for example, when a quenching detection signal is received from at least one quenching detector 50), the controller 60 is configured to control the exciting power supply 34 of the superconducting coil excitation circuit 30 so as to demagnetize the superconducting coil 32 of the superconducting coil excitation circuit 30 in which quenching is not detected, among the plurality of superconducting coil excitation circuits 30. In this case, for example, the controller 60 may control the exciting power supply 34 such that a current is supplied from the exciting power supply 34 to the superconducting coil 32 according to a predetermined demagnetization current profile. The demagnetization current profile may be predetermined, for example, to reduce the current at a constant rate. Alternatively, the controller 60 may control the exciting power supply 34 according to a known demagnetization method for demagnetizing the superconducting coil 32.

On the other hand, when all the quenching detectors 50 do not detect quenching (for example, when all the quenching detectors 50 do not output the quenching detection signal), the controller 60 does not interfere with the operation of the superconducting magnet device 10. That is, the superconducting magnet device 10 can generate a magnetic field by energizing the superconducting coil 32 of each superconducting coil excitation circuit 30.

The controller 60 is implemented by elements or circuits such as a CPU or a memory of a computer as a hardware configuration, and is implemented by a computer program or the like as a software configuration. However, in FIG. 3, the controller 60 is appropriately depicted as the functional block in which the hardware and the software are implemented by the cooperation thereof. It is clear for those skilled in the art that such a functional block can be implemented in various manners through combination between hardware and software.

When quenching occurs in any of the superconducting coils 32, the superconducting coil 32 transitions from superconductivity to normal conduction, and resistance is generated inside the coil. At least a part of the current flowing through the coil in the superconducting state up to that point is converted into Joule heat, and the temperature of the superconducting coil 32 can rise. In order to recover the superconducting coil from the quenching and to operate the superconducting coil 32 again, it is necessary to recool the superconducting coil 32.

In the existing art, a plurality of superconducting coils provided in a superconducting magnet device are connected in series with a single exciting power supply, and receive a current supplied from the exciting power supply. When quenching occurs in a certain superconducting coil, an abnormal operation such as a temperature rise caused by the quenching may propagate to or affect the other superconducting coils, which may cause quenching in the other superconducting coils. The resulting overall temperature rise in the superconducting magnet device can increase the time required for recooling.

On the other hand, in the present embodiment, the superconducting magnet device 10 includes a plurality of superconducting coil excitation circuits 30 that can operate independently of each other, and each superconducting coil excitation circuit 30 includes the superconducting coil 32 and the exciting power supply 34 thereof. In this manner, by dividing the power supply configuration of the superconducting magnet device 10 into a plurality of systems, even if quenching occurs in a certain system, it is possible to prevent the quenching from immediately spreading to another system. Preferably, in a system in which the quenching does not occur, the superconducting coil 32 can be promptly demagnetized before the quenching occurs under the control of the controller 60. It is possible to reduce an increase in temperature of the superconducting magnet device 10 and shorten the time required for recovery from quenching, which is advantageous.

In the superconducting coil disposition as described above, that is, in a case where the plurality of superconducting coils 32 are disposed around the central cavity 24 such that the coil center axes are aligned in the radial direction of the superconducting magnet device 10, a radial outward electromagnetic force corresponding to a current acts on each superconducting coil 32. When the currents flowing through the superconducting coils 32 are different due to a variation in the currents of the superconducting coils 32, the magnitudes of the electromagnetic force acting on the superconducting coils 32 are also different, and the combined force acts on the superconducting magnet device 10. The superconducting magnet device 10 needs to have a strong structure that can withstand this combined force.

However, in this embodiment, each superconducting coil excitation circuit 30 includes a pair of superconducting coils 32 disposed to face each other. These facing superconducting coils 32 are connected in series with the same exciting power supply 34. Therefore, variations in the currents are unlikely to occur in the superconducting coils 32 facing each other, and it is easy to supply currents of the same magnitude. When the currents flowing through the facing superconducting coils 32 are equal, the magnitudes of the electromagnetic forces are the same and the directions are opposite to each other, so that the electromagnetic forces acting on the facing superconducting coils 32 are canceled out. The combined force is ideally zero. This makes it possible to reduce the structural strength required for the superconducting magnet device 10, and thus is useful for making the superconducting magnet device 10 a simple structure.

As shown in FIG. 3, each of the plurality of superconducting coil excitation circuits 30 may include Joule heat generating elements 33 connected in parallel to the superconducting coils 32. The Joule heat generating element 33 can generate heat when energized, and may include a general linear resistance element (that is, according to Ohm's law), or may include a non-linear resistor. The non-linear resistor may have a non-linear characteristic in which the resistance value is high when the voltage applied to the non-linear resistor is small and the resistance value is low when the voltage applied to the non-linear resistor is large (the non-linear resistor may have a first resistance value when the voltage applied to the non-linear resistor is a first value, and have a second resistance value that is less than the first resistance value when the voltage applied to the non-linear resistor is a second value that is greater than the first value). The non-linear resistor may be, for example, a rectifying element such as a diode or a thyristor. In this embodiment, the Joule heat generating element 33 includes a diode as an example. Alternatively, the non-linear resistor may be a varistor. The Joule heat generating element 33 may include both a linear resistor and a non-linear resistor, and for example, these may be connected in series.

When quenching occurs during the operation of the superconducting coil 32, a voltage generated in the superconducting coil 32 is also applied to the Joule heat generating element 33. At this time, a current can flow from the superconducting coil 32 to the Joule heat generating element 33, and at least a part of the electromagnetic energy stored in the superconducting coil 32 can be converted into heat by the Joule heat generating element 33 and consumed. In this way, energy is extracted from the superconducting coil 32 by the Joule heat generating element 33, whereby the superconducting coil 32 can be protected when quenching occurs. Since the energy of the superconducting coil 32 is reduced, it is possible to prevent or reduce damage to the superconducting coil 32 and the periphery thereof which may be caused by the reduction.

The present invention has been described above based on the examples. It will be understood by those skilled in the art that the present invention is not limited to the above embodiments, various design changes can be made, various modification examples are possible, and such modification examples are also within the scope of the present invention. Various features described in relation to the certain embodiment are also applicable to other embodiments. A new embodiment resulting from combination has the effects of each of the combined embodiments.

The above-described embodiment has been described as an example of a case where the superconducting magnet device 10 has two pairs (that is, four) of the superconducting coils 32, but the superconducting magnet device 10 may have any number of superconducting coils 32. For example, the superconducting magnet device 10 may include three pairs (that is, six) of superconducting coils 32, or the superconducting coils 32 of each pair may be disposed to face each other. In this case, the superconducting magnet device 10 may include three superconducting coil excitation circuits 30, and each superconducting coil excitation circuit 30 includes a pair of superconducting coils 32 disposed to face each other and an exciting power supply 34 thereof.

It is not essential that the plurality of superconducting coils 32 included in one superconducting coil excitation circuit 30 are disposed to face each other. Therefore, the superconducting coil excitation circuit 30 may include a plurality of (for example, two) superconducting coils 32 adjacent to each other (for example, around the Z axis) and an exciting power supply 34 thereof.

Alternatively, the superconducting coil excitation circuit 30 may include one superconducting coil 32 and an exciting power supply 34 thereof.

The above-described embodiment has been described as an example of a case where the superconducting magnet device 10 is mounted on the single crystal pulling device, but the superconducting magnet device 10 may be mounted on another device. For example, the superconducting magnet device 10 can be mounted on a high-magnetic field utilization device as a magnetic field source of, for example, a nuclear magnetic resonance (NMR) system, a magnetic resonance imaging (MRI) system, an accelerator such as a cyclotron, a high energy physical system such as a nuclear fusion system, or other high-magnetic field utilization devices (not shown) and can generate a high magnetic field required for the device.

In the above-described embodiment, the superconducting magnet device 10 is configured as a so-called conduction cooling type in which the superconducting coil 12 is directly cooled by the cryocooler 16, instead of as an immersion cooling type in which the superconducting coil 12 is immersed in a cryogenic liquid refrigerant such as liquid helium. However, the superconducting magnet device 10 may be an immersion cooling type. In this case, the superconducting coil 12 may be cooled by being immersed in a cryogenic liquid such as liquid helium.

It should be understood that the invention is not limited to the above-described embodiment, but may be modified into various forms on the basis of the spirit of the invention. Additionally, the modifications are included in the scope of the invention.

What is claimed is:

1. A superconducting magnet device comprising:

a plurality of superconducting coil excitation circuits which each include a superconducting coil and an exciting power supply thereof and are operable independently of each other;

a plurality of quenching detectors each of which detects quenching of the superconducting coil of a corresponding superconducting coil excitation circuit; and a controller that, when at least one of the plurality of quenching detectors detects the quenching, controls the exciting power supply of a superconducting coil excitation circuit in which the quenching is not detected among the plurality of superconducting coil excitation circuits to demagnetize the superconducting coil of that superconducting coil excitation circuit.

2. The superconducting magnet device according to claim 1, wherein each superconducting coil excitation circuit includes a pair of superconducting coils disposed to face each other.

* * * * *